US005876543A

United States Patent [19]

Kinpara et al.

[11] Patent Number: 5,876,543

[45] Date of Patent: Mar. 2, 1999

[54] METHOD OF FINISHING BOARD WITH THICK RESIN FILM FOR MAKING UNDER LAYER INVISIBLE

[75] Inventors: Shigeru Kinpara; Hisayoshi Ohsumi; Yoshinori Sagisaka, all of Shizuoka, Japan

[73] Assignee: Yamaha Corporation, Japan

[21] Appl. No.: 911,176

[22] Filed: Aug. 14, 1997

Related U.S. Application Data

[63] Continuation of Ser. No. 494,361, Jun. 23, 1995, abandoned.

[30] Foreign Application Priority Data

Jun. 30, 1994 [JP] Japan .................................... 6-150171

[51] Int. Cl.[6] .............................. B05D 1/02; B05D 1/04; B29C 39/02; B32B 31/12

[52] U.S. Cl. .......................... 156/154; 156/245; 156/267; 156/331.7; 427/483; 427/485; 427/355; 427/421; 427/428

[58] Field of Search .................................... 144/345, 346, 144/348, 350; 156/154, 245, 267, 331.7; 427/458, 483, 485, 355, 421, 428

[56] References Cited

U.S. PATENT DOCUMENTS

| | | | |
|---|---|---|---|
| 3,907,624 | 9/1975 | Gravely, Jr. | 156/245 |
| 4,637,954 | 1/1987 | Ohsumi . | |
| 4,890,656 | 1/1990 | Ohsumi et al. . | |
| 5,183,090 | 2/1993 | McClung et al. | 144/350 |

FOREIGN PATENT DOCUMENTS

| | | | |
|---|---|---|---|
| 155906 | 11/1989 | Japan . | |
| 3-162904 | 7/1991 | Japan | 144/346 |

*Primary Examiner*—Richard Crispino
*Attorney, Agent, or Firm*—Ostrolenk, Faber, Gerb & Soffen, LLP

[57] ABSTRACT

Thick molded strips of unsaturated polyester resin are bonded to butt edges of a panel member, upper and lower edge portions of the thick molded strips are cut so as to make upper and lower edge surfaces coplanar with upper and lower surfaces of the panel member, the coplanar surface is, thereafter, coated with the unsaturated polyester resin, and the polyester resin film and the thick molded strips are, finally, trimmed with a polisher; even though the molded strips are decreased in thickness through the polishing, the molded strips are thick enough to make the butt edges of the panel invisible, and the appearance of the board member is improved.

10 Claims, 7 Drawing Sheets

METHOD OF FINISHING BOARD WITH THICK RESIN FILM FOR MAKING UNDER LAYER INVISIBLE

This is a Continuation of application Ser. No. 08/494,361 filed on Jun. 23, 1995, now abandoned.

FIELD OF THE INVENTION

This invention relates to a method of finishing a board and, more particularly, to a method of finishing a board with a thick resin film for making an under-layer invisible.

DESCRIPTION OF THE RELATED ART

A wooden product such as a furniture or a piano is fabricated from various board members, and the board members are finished with coating material.

A typical example of the coating method is disclosed in Japanese Patent Publication of Examined Application No. 1-55906. According to the Japanese Patent Publication, a flat panel is finished through the following sequence.

First, a phenol resin impregnated panel is prepared, and a major surface of the phenol resin impregnated panel is coated with black polyester resin through a curtain flow coater. The panel thus coated with the black polyester resin is cut into strips.

The strips are slightly wider than butt ends of a decorative laminated panel, and are bonded to the butt ends.

After a trimming, the decorative laminated panel passes through the curtain flow coater so as to coat the major surface with the black polyester resin. The black polyester resin film is dried, and the coated polyester resin films over the butt edges and the major surface are polished.

FIG. 1A illustrates the board member finished through the prior art method. Reference numeral 1 designates the decorative laminated panel, and the strip 2 is bonded to the butt end 1*a* of the decorative laminated panel 1. The major surface 1*b* and the edge 2*a* of the strip 2 are coated with the black polyester resin film 3, and the black polyester resin films 2*b* and 3 are continuously polished. The polished polyester resin films 2*b* and 3 improve the external appearance of the board member However, the prior art board member encounters a problem in that the phenol resin impregnated panel 2*c* tends to be seen through the polished polyester resin film 2*b*. This is because of the fact that the black polyester resin film is of the order of 0.8 millimeter before the polishing, and the polished polyester resin film 2*b* is too thin to perfectly make the phenol resin impregnated panel 2*c* invisible. Especially, while the black polyester resin films 3 and 2*b* are being continuously polished, the corner 4 is rounded, and the phenol resin impregnated panel 2*c* is liable to be exposed.

The thin black polyester resin films 3 and 2*b* tend to be waved.

Of course, if thickness of the black polyester resin film is increased, the polished polyester resin film perfectly makes the phenol resin impregnated panel invisible. However, cracks take place in a surface of a thick polyester resin film, and the black polyester resin film is maximized at the aforesaid value.

Especially, if the strips 2 are bonded to the butt edges 1*a* of the decorative laminated panel 1 as shown in FIG. 1B, the phenol resin impregnated panel 2*c* is exposed to the outer surface, and deteriorates the external appearance.

Yet another problem is the complexity of the finishing work. Namely, the decorative laminated panel is coated with the polyester resin, and the decorative laminated panel coated with the polyester resin is, thereafter, cut into the strips 2. The strip 2 is prepared through the two steps, and an operator is expected to be careful in the dimensions of the strip 2.

Still another problem is high production cost. The two components, i.e., the phenol resin impregnated panel 2*c* and the black polyester resin film 2*b* increases the production cost together with the aforesaid complex sequence. Nevertheless, the phenol resin impregnated panel 2*c* is indispensable, because it prevents the hygroscopic wood plate of the decorative laminated panel 1 from the humid air.

SUMMARY OF THE INVENTION

It is therefore an important object of the present invention to provide an economical method of finishing a board member which provides an excellent external appearance without a complex work.

To accomplish the object, the present invention proposes to mold a butt edge strip of resin.

In accordance with the present invention, there is provided a method of finishing a board member comprising the steps of molding a butt edge strip of a first resin, bonding the butt edge strip to a butt edge of a panel member, coating a major surface of the panel member and an edge of the butt edge strip with a finishing film of a second resin, and polishing the butt edge strip and the finishing film.

BRIEF DESCRIPTION OF THE DRAWINGS

The features and advantages of the method of finishing a board member according to the present invention will be more clearly understood from the following description taken in conjunction with the accompanying drawings in which.

DESCRIPTION OF THE PREFERRED EMBODIMENTS

First Embodiment

Figure 1A:
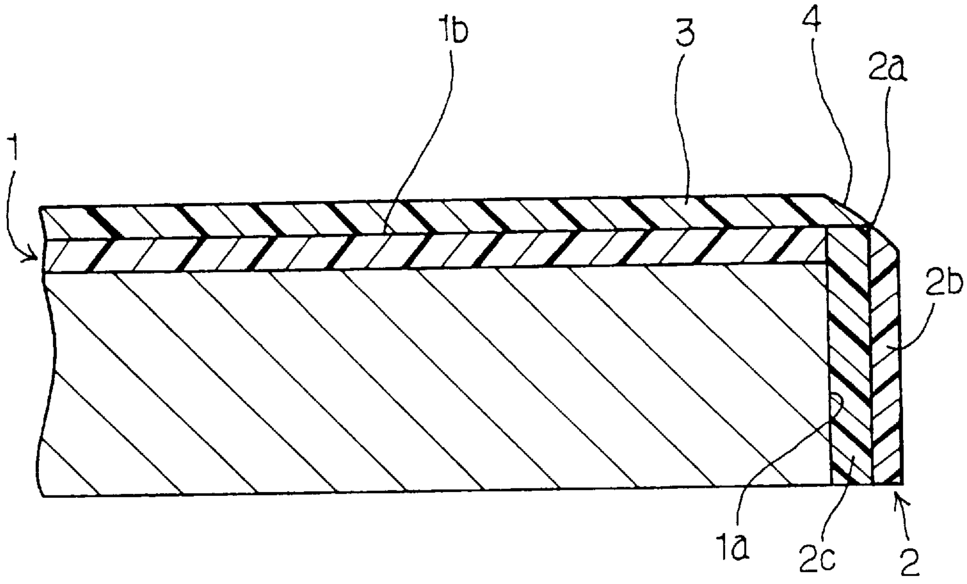
Fig. 1A PRIOR ART
FIG. 1A is a cross sectional view showing the structure of the board member finished through the prior art method.
Figure 1B:
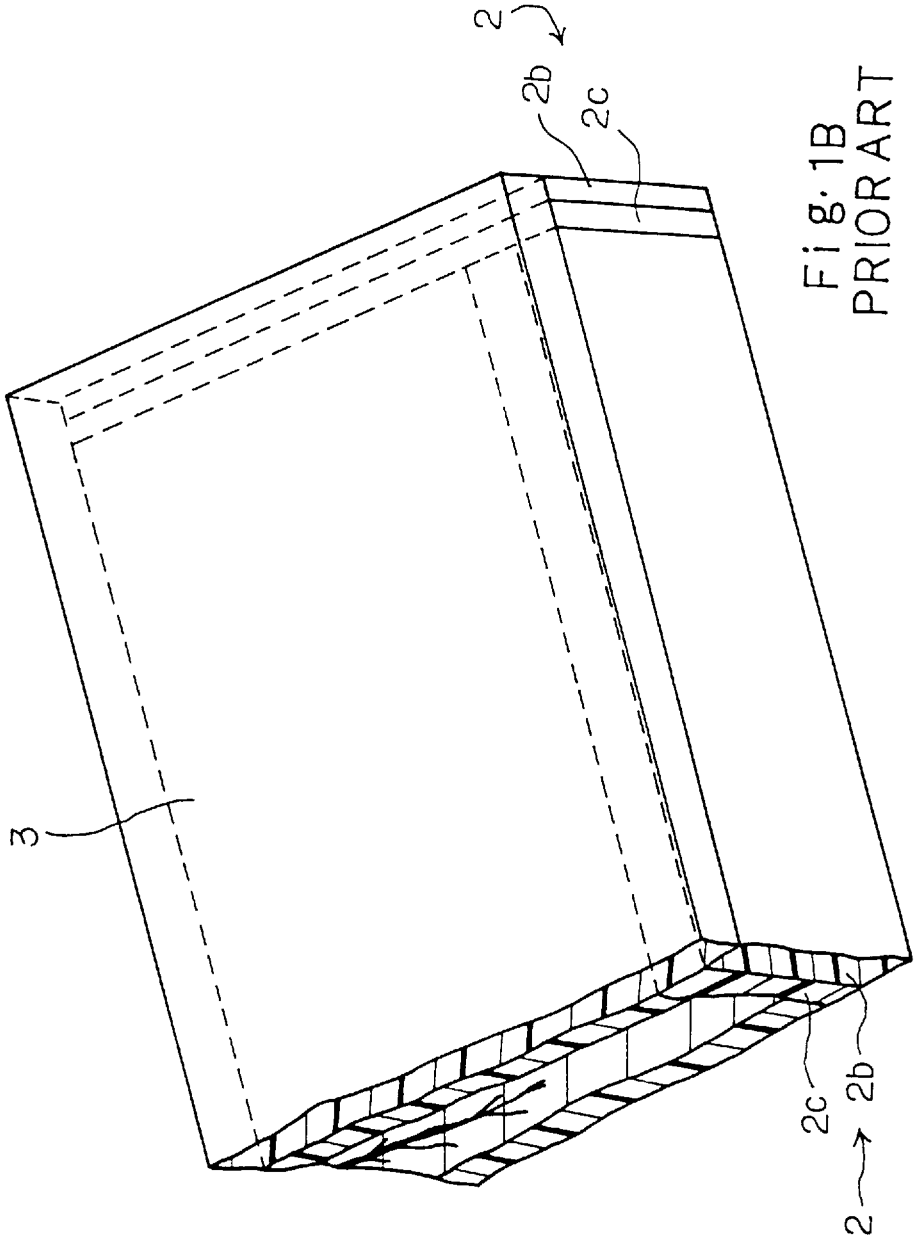
Fig. 1B PRIOR ART
FIG. 1B is a perspective view showing the modification of the prior art board.

A finishing work embodying the present invention starts with preparation of a mold 10, a movable injector 11 and liquid resin. The mold 10 is formed of ultra-high molecular weight polyethylene, and a plurality of grooves 10*a*, 10*b* and 10*c* are formed in the surface portion of the mold 10. In this instance, each of the grooves 10*a* to 10*c* is 1600 millimeters in length, 30 millimeters in width and 2 millimeters in depth. The dimensions of the groove 10*a*/10*b*/10*c* is changed depending upon butt edges of a laminated panel member 12 (see FIG. 2B), and the grooves 10*a* to 10*c* may be different in dimensions.

The movable injector 11 is provided over the mold 10, and is movable in a longitudinal direction A of the mold 10. The movable injector 11 includes a reservoir tank 11*a* for keeping liquid resin and injection nozzles (not shown) open to the grooves 10*a* to 10*c*, respectively. In this instance, unsaturated polyester resin is maintained in the reservoir tank 11*a*, and is colored in black. Soft unsaturated polyester resin is desirable, because cracks hardly take place. In other words, when the soft polyester resin is used for a butt edge strip, a thick butt edge strip is formed without a crack, and the phenol resin impregnated panel is not necessary for the butt edge strip.

The unsaturated polyester resin contains unsaturated dibasic acid and dihydric alcohol. The available unsaturated dibasic acids are maleic anhydride, maleic acid, fumaric acid, citraconic acid, itaconic acid and dimeric acid. Desirable dihydric alcohol is selected from the group consisting of ethylene glycol, propylene glycol, 1,3 . . . bytylene glycol, 2,3 . . . butylene glycol, butane diol, butene diol and neo pentyl glycol. The unsaturated polyester resin containing the desirable dihydric alcohol is hereinbelow referred to soft unsaturated polyester resin.

The soft unsaturated polyester resin with the large breaking energy equal to or greater than 40 kg $\%/mm^2$ is large in not only the elongation but also the tensile strength. A hydrocarbon radical with a large carbon number is incorporated in the glycol used for the soft unsaturated polyester resin. The breaking energy is defined as the integral of a stress-strain curve under a tensile speed at 10 mm/minute.

Polyurethane resin, diarylphthalete resin and acrylate resin are available for the liquid resin. Examples of the acrylate resin are urethane acrylate, epoxy acrylate and polyester acrylate.

When the soft polyester resin is solidified in the grooves 10*a* to 10*c*, the polyester resin strips are taken out from the grooves 10*a* to 10*c*, and the polyester resin strips are heated to 50 to 150 degrees in centigrade. The polyester resin strips are subjected to conditions to cause thermosetting of the polyester resin, and butt edge strips 13 are obtained.

The polyester resin strips have a depth equal to the depth of the grooves, 10*a* to 10*c*, i.e., in this first embodiment, 2 millimeter strips are ground from 2 millimeters to 1.0 to 1.9 millimeters. If the polyester resin strips are molded in a mold having grooves 5 millimeters deep, the polyester resin strips are ground from 5.0 millimeters to 1.0 to 4.9 millimeters.

In this instance, decorative panels 14*a* and 14*b* are bonded to upper and lower surfaces of a wooden panel 14*c*, and the decorative panels 14*a* and 14*b* and the wooden panel 14*c* form in combination the laminated panel member 12. Phenol resin impregnated panels or melamine resin impregnated panels serve as the decorative panels 14*a* and 14*b*. A plywood panel coated with ultraviolet cured unsaturated polyester resin and a medium fiber board coated with the ultraviolet cured unsaturated polyester resin are available for the decorative panels 14*a*/14*b*. The decorative panels 14*a* and 14*b* may be formed from a plywood panel overlain by a sheet of decorative paper and further coated with unsaturated polyester resin.

Figure 2A:
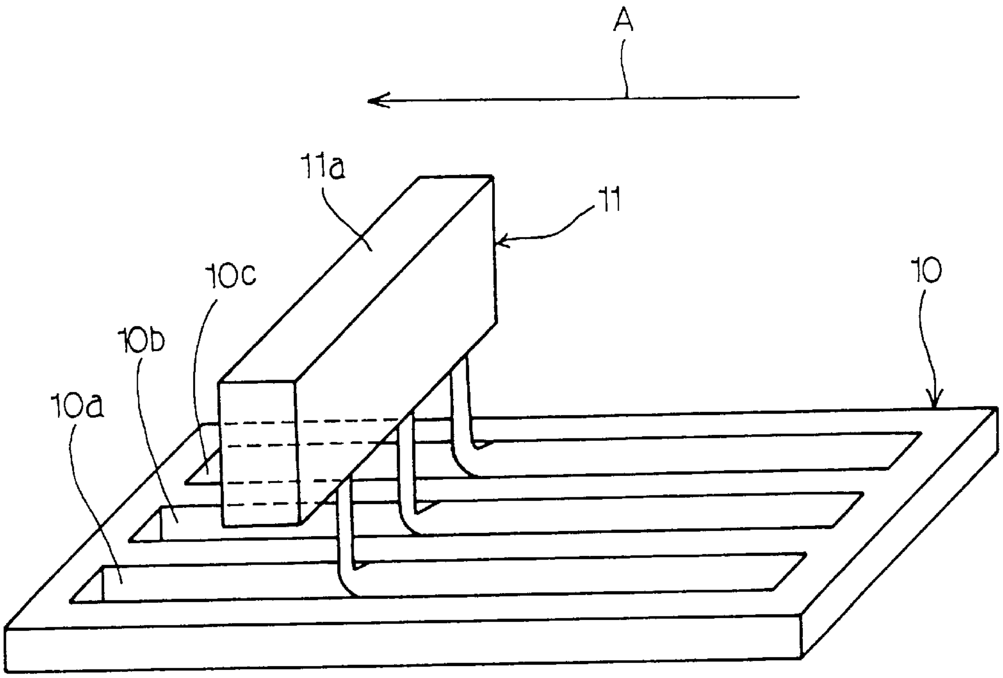
FIGS. 2A to 2F are views showing essential steps of a finishing method according to the present invention.
Figure 2B:
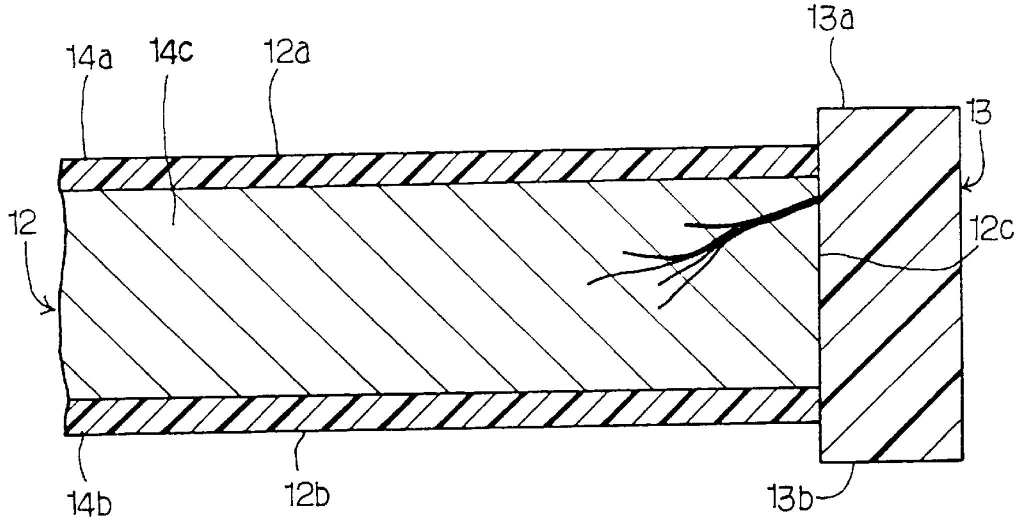

The decorative panel 12 has upper and lower surfaces 12*a* and 12*b* and side surfaces or the butt edges 12*c*. The butt edge strips 13 are bonded to the butt edges 12*c* by using an adhesive compound in the urethane system or the epoxy system at 15 to 130 degrees in centigrade under pressure of 0.05 to 2.00 MPa. FIG. 2B illustrates the butt edge strip 13 bonded to the decorative panel 12.

Figure 2C:
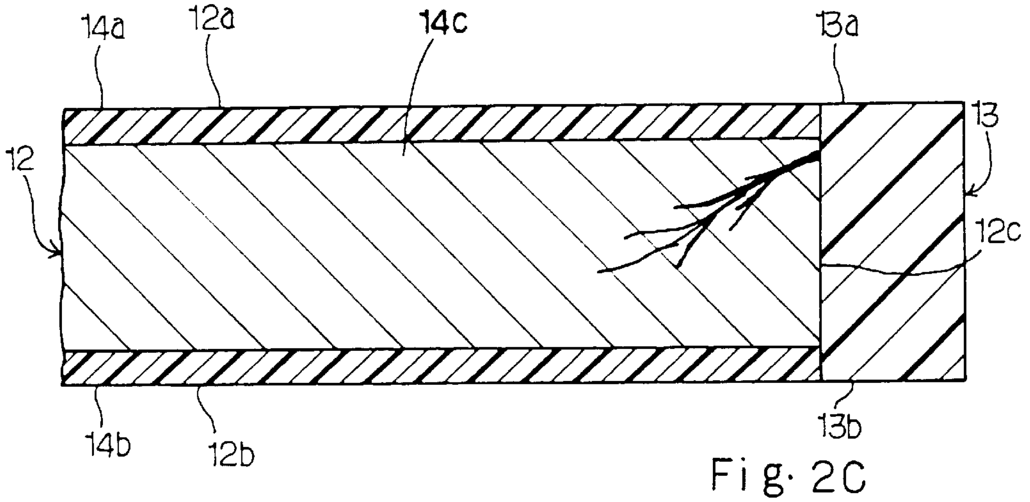

The butt edge strips 13 are wider than the butt edges 12*c*, and upper and lower edges 13*a* and 13*b* project from the upper and lower surfaces 12*a*/12*b* of the decorative panel 12. For this reason, the upper and lower edges 13*a* and 13*b* are cut so as to be coplanar with the upper and lower surfaces 12*a* and 12*b* of the decorative panel 12 as shown in FIG. 2C.

Figure 2D:
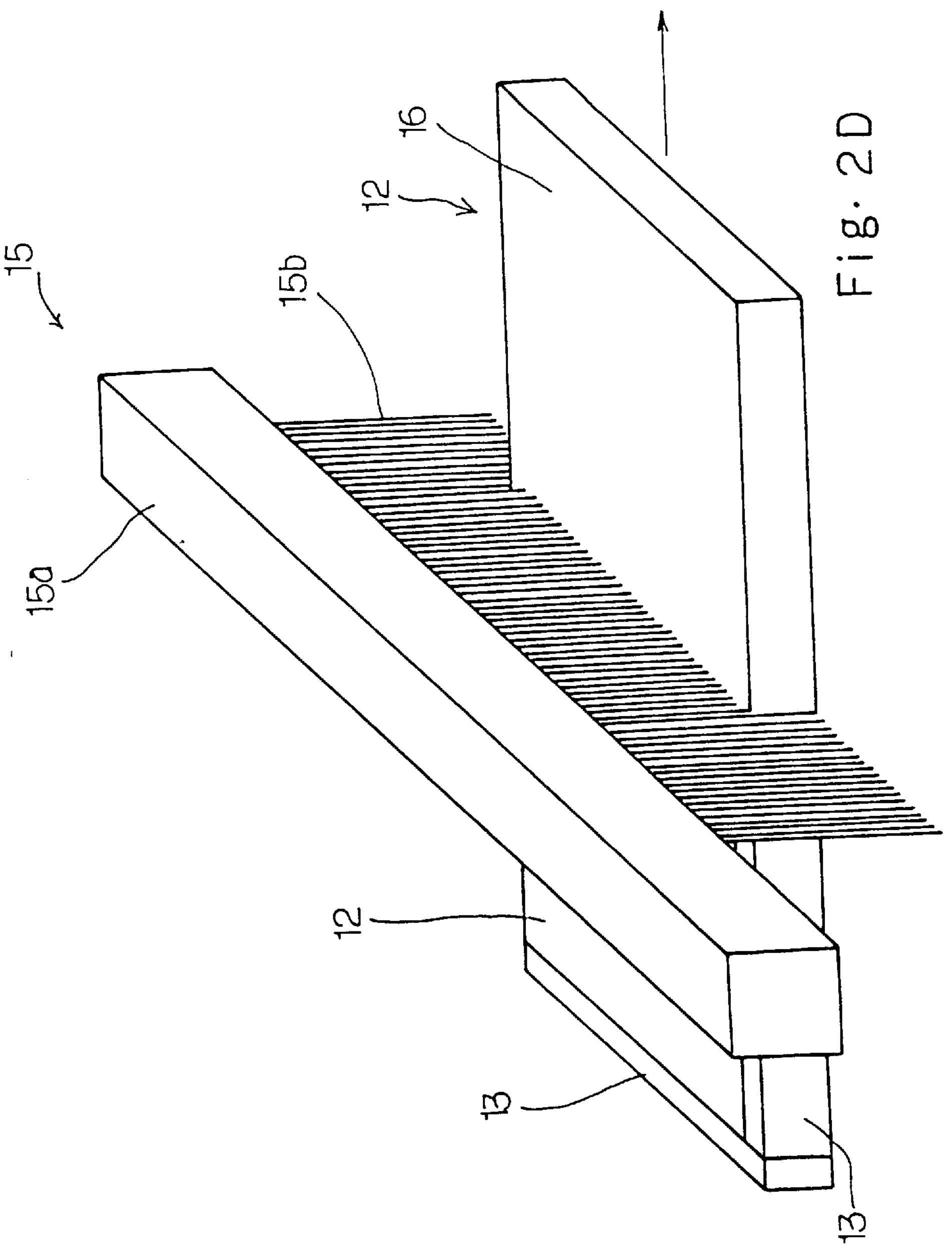

Thereafter, the decorative panel 12 thus treated is placed on a transfer mechanism of a curtain flow coater 15 such as a belt conveyer, and the transfer mechanism conveys the decorative panel 12 through a coater head 15*a*. The coater head 15*a* downwardly spouts liquid resin colored in black, and forms a curtain 15*b* of the liquid resin. While the decorative panel 12 is passing through the curtain of the liquid resin, the curtain 15*b* coats the upper surface 12*a* of the decorative panel 12 and the upper surfaces 13*a* of the butt edge strips 13 with the liquid resin as shown in FIG. 2D, and a resin film 16 covers the upper surfaces 12*a* and 13*a*.

In this instance, the curtain flow coater 15 is used for coating the upper surfaces 12*a* and 13*a*. However, a spray coater, a roll coater and an electrostatic coating system are available for the coating stage.

Although another liquid resin different from the butt edge strips 13 is available for the resin film 16, it is desirable to use the same unsaturated polyester resin as the unsaturated polyester resin for the butt edge strips 13 because of homogeneity and strong adhesion. However, if the butt edge strips 13 are formed of the unsaturated polyester resin with the breaking energy equal to or greater than 40 kg $\%/mm^2$, it is recommendable for the resin film 16 to be formed of another unsaturated polyester resin slightly larger in hardness. The liquid resin is not limited to the unsaturated polyester resin. Ultraviolet setting resin such as urethane acrylate is, by way of example, available. Epoxy resin may be available for the coating film.

If the resin film 16 is formed of the unsaturated polyester resin, the resin film 16 is subjected to the thermo-setting so as to accelerate the hardening. If a suitable cathalyzer is mixed into the unsaturated polyester resin, the resin film 16 is hardened in room temperature. Examples of the cathalyzer are methyl ethyl ketone peroxide, cyclohexane peroxide, cobalt octenoic acid and cobalt naphthenate.

On the other hand, if the resin film 16 is formed of a photo-setting resin, the resin film 16 is subjected to a photo-radiation. The final thickness of the resin film 16 is 0.35 to 0.50 millimeters in this instance. If a soft substance is used, the thickness is increased to 0.5 to 1.9 millimeter.

Figure 2E:
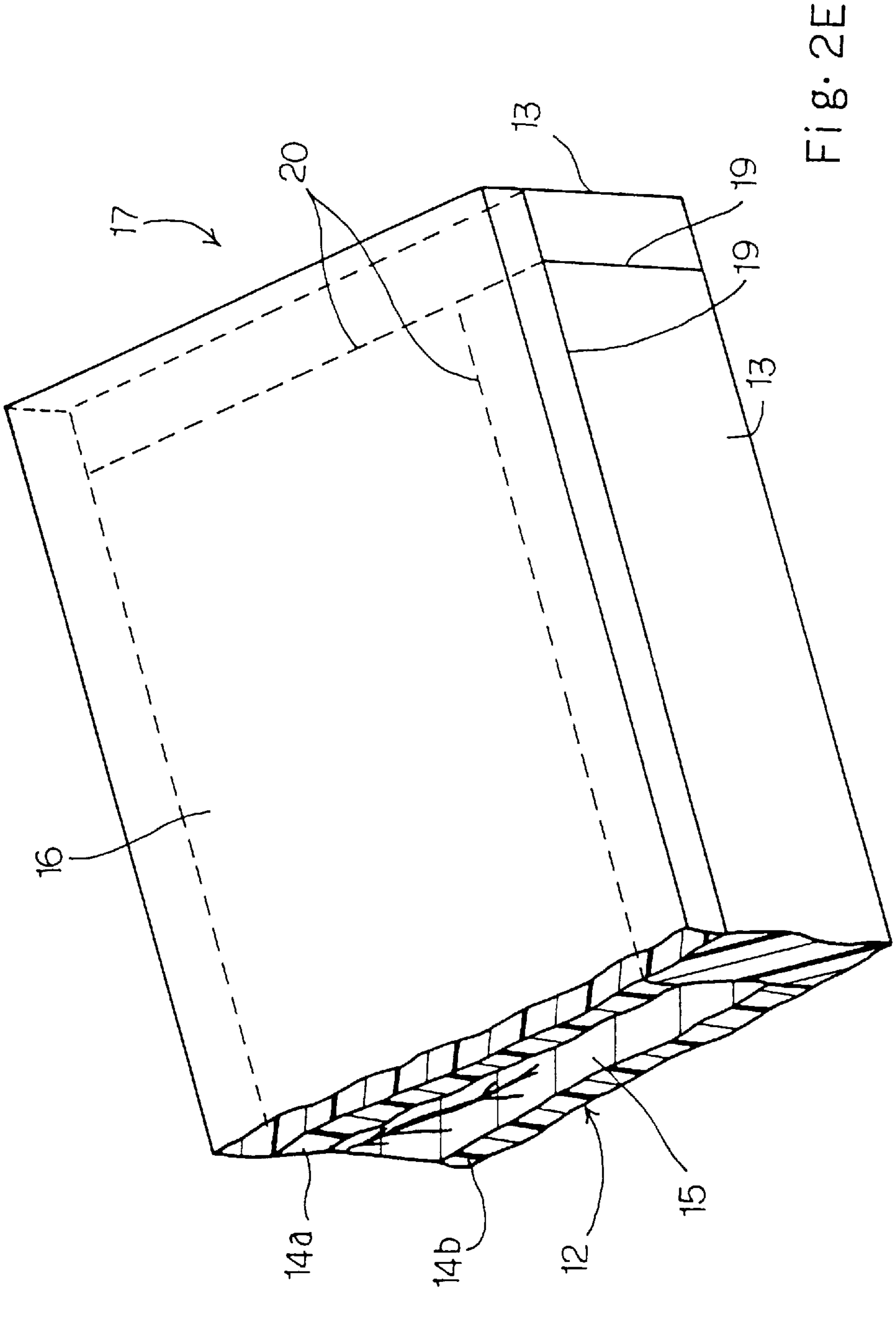

FIG. 2E illustrates a board member 17 after the hardening stage. The board member 17 is subjected to a grinding and a polishing.

Figure 2F:
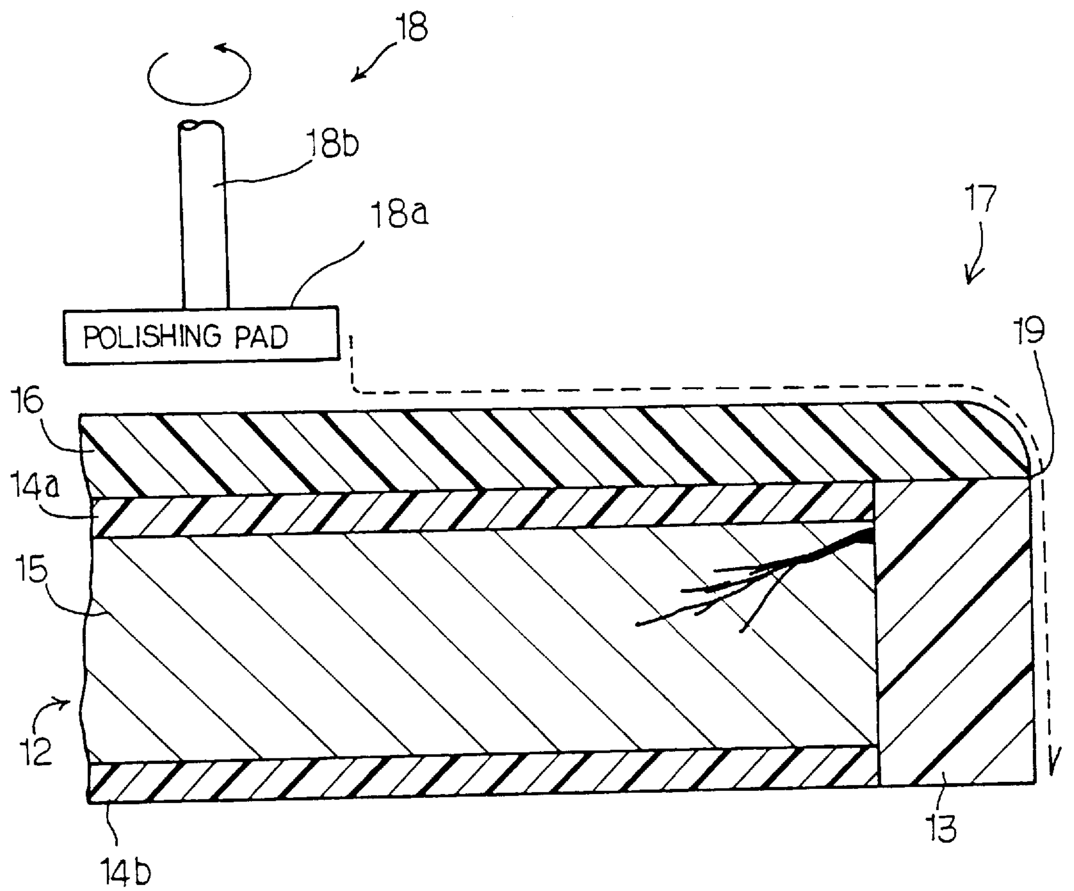

FIG. 2F shows the board member 17 treated with the polisher 18. The polisher 18 is equipped with a polishing pad 18*a* connected to a rotating shaft 18*b*, and a suitable mechanism (not shown) moves the rotating shaft 18*b* and, accordingly, the polishing pad 18*a* along the upper surface of the resin film 16 and the upper surfaces 13*a* of the butt edge strips 13.

Even though the butt edge strips 13 are decreased in thickness through the grinding and the polishing, the molded butt edge strips 13 are thick enough to make the butt edges of the decorative panel 12 invisible. In this instance, the butt edge strips 13 are 1.0 to 1.9 millimeters thick as described hereinbefore. Although the minimum thickness of the butt edge strips 13 is varied depending upon the resin and the colors of the decorative panel 12 and the strips 13, the butt edge strips 13 thicker than 0.3 millimeters can perfectly make the butt edges of the decorative panel 12 invisible.

The butt edge strips 13 thicker than 0.3 millimeter are liable to be waved. However, if the thickness is increased to 0.7 millimeter, the butt edge strips 13 are not only perfectly non-transparent but also smooth.

As described hereinbefore, the phenol resin impregnated panel of the prior art strip 2 prevents the wood from moisture, and is indispensable. However, if the thickness of the butt edge strips 13 is increased to 0.7 millimeter, the butt edge strips 13 can prevent the wood from moisture, and is economical. Thus, the butt edge strips 13 thicker than 0.7 make the process simple and economical.

The boundaries 19 between the resin film 16 and the strips 13 and between the strips 13 are not distinguishable, and the resin film 16 seems to be continuous to the butt edge strips 13.

EXAMPLES

The present inventors molded the butt edge strips 13 of the soft unsaturated polyester resin, and the butt edge strips 13 were 0.3 millimeter, 0.6 millimeter, 1.2 millimeters, 2.5 millimeters and 5.0 millimeters in thickness. Using an adhesive compound in the urethane system, these butt edge strips were bonded to the four butt edges of an R/C (Rotary Core) plywood panel of 300 mm×300 mm×25 mm at 90 to 95 degrees centigrade under pressure 0.5 to 1.0 MPa for seven minutes. The upper and lower edges of the butt edge strips were cut so as to make them coplanar with the upper and lower surfaces of the plywood panel. The upper surface of the plywood panel and the upper edges of the butt edge strips were coated with the resin film through the curtain flow coater.

The various soft unsaturated polyester resins different in breaking energy were used for the butt edge strips, and were 15.7 kg %/mm$^2$, 23.9 kg %/mm$^2$ and 33.8 kg %/mm$^2$.

The present inventors evaluated the quality of the board members, and the evaluation was summarized in Table 1, and the unsaturated polyester resin with the breaking energy of 15.7 kg %/mm$^2$, the unsaturated polyester resin with the breaking energy of 23.9 kg %/mm$^2$ and the unsaturated polyester resin with the breaking energy of 33.8 kg %/mm$^2$ were respectively used for specimens 1–5, 6–10 and 11–15. Term "depression" means a depression formed in the resin film along the boundaries 20 (see FIG. 2E) between the plywood panel and the butt edge strips. "Continuity" was evaluated whether or not the bonded boundary 19 between the resin film and the butt edge strips were seen. "Weather-proof" was examined whether or not a crack took place after two cycles each retaining the board member at 35° C. and 95% RH (Relative Humidity) for 2 days and at 35° C. and 20 RH for 5 days. "Heat-proof" was examined whether or not a crack took place after ten cycles each retaining the board member at −20° C. for 15 hours and at 50° C. for 8 hours.

Marks "A", "B" and "C" in the proof tests mean "no crack in all the four butt edge strips so that there is no problem in practical applications", "crack taking place in one of the four butt edge strips so that there is a problem in practical application" and "cracks taking place in at least two of the four butt edge strips so that the specimen is not available in practical applications". Marks "A", "B" and "C" in the others means "good", "there is a problem in practical applications" and "never available".

TABLE 1

| | Thick- | | | | | Test | | Syn- |
|---|---|---|---|---|---|---|---|---|
| | ness | Appearance | | | | Weath. | Heat | thetic |
| No. | (mm) | depression | Continuity | Uniformity | Finish | proof | prf. | judge |
| 1 | 0.3 | A | A | B | B | A | A | B |
| 2 | 0.6 | A | A | A | A | A | B | B |
| 3 | 1.2 | A | A | A | A | A | C | C |
| 4 | 2.5 | A | A | A | A | A | C | C |
| 5 | 5.0 | A | A | A | A | B | C | C |
| 6 | 0.3 | A | A | B | B | A | A | B |
| 7 | 0.6 | A | A | A | A | A | B | B |
| 8 | 1.2 | A | A | A | A | A | B | B |
| 9 | 2.5 | A | A | A | A | A | C | C |
| 10 | 5.0 | A | A | A | A | B | C | C |
| 11 | 0.3 | A | A | B | B | A | A | B |
| 12 | 0.6 | A | A | A | A | A | A | A |
| 13 | 1.2 | A | A | A | A | A | A | A |
| 14 | 2.5 | A | A | A | A | A | A | A |
| 15 | 5.0 | A | A | A | A | A | B | B |

Table 2 shows the evaluation for the unsaturated polyester resin with the breaking energy of 40.0 kg %/mm$^2$ (resulting in specimens 16 to 20), the unsaturated polyester resin with the breaking energy of 52.3 kg %/mm$^2$ (resulting in specimens 21 to 25) and the unsaturated polyester resin with the breaking energy of 67.7 kg %/mm$^2$ (resulting in specimens 26 to 30.

TABLE 2

| | Thick- | | | | | Test | | Syn- |
|---|---|---|---|---|---|---|---|---|
| | ness | Appearance | | | | Weath. | Heat | thetic |
| No. | (mm) | depression | Continuity | Uniformity | Finish | proof | prf. | judge |
| 16 | 0.3 | A | A | B | B | A | A | B |
| 17 | 0.6 | A | A | A | A | A | A | A |
| 18 | 1.2 | A | A | A | A | A | A | A |
| 19 | 2.5 | A | A | A | A | A | A | A |
| 20 | 5.0 | A | A | A | A | B | A | A |
| 21 | 0.3 | A | A | B | B | A | A | B |
| 22 | 0.6 | A | A | A | A | A | A | A |
| 23 | 1.2 | A | A | A | A | A | A | A |

TABLE 2-continued

| | Thick- | | | | | Test | | Syn- |
|---|---|---|---|---|---|---|---|---|
| | ness | Appearance | | | | Weath. | Heat | thetic |
| No. | (mm) | depression | Continuity | Uniformity | Finish | proof | prf. | judge |
| 24 | 2.5 | A | A | A | A | A | A | A |
| 25 | 5.0 | A | A | A | A | A | A | A |
| 26 | 0.3 | A | A | B | B | A | A | B |
| 27 | 0.6 | A | A | A | A | A | A | A |
| 28 | 1.2 | A | A | A | A | A | A | A |
| 29 | 2.5 | A | A | A | A | A | A | A |
| 30 | 5.0 | A | A | A | A | A | A | A |

As will be understood from Table 1, if the butt edge strips are increased in thickness, more cracks take place in the butt edge strips after the weather/heat proof tests. On the other hand, if the butt edge strip is formed of the unsaturated polyester resin with the breaking energy equal to or greater than 40.0 kg $\%/mm^2$, no crack takes place regardless of the thickness after the weather and heat proof tests.

The present inventors further evaluated adhesive compounds used for bonding the butt edge strips to the panel. Using the following adhesive compounds, the butt edge strips of specimen “28” were bonded to the plywood panels at 90 to 95 degrees centigrade under 0.5 to 1.0 MPa for seven minutes. The upper and lower edges of the butt edge strips were cut so as to create coplanar surfaces. The upper surfaces of the plywood panels were coated through the curtain flow coater, and the quality of the board members were evaluated as shown in Table 3. Marks “A”, “B” and “C” are similar to those of Tables 1 and 2.

Adhesive compound “a” was in urethane resin system.

Adhesive compound “b” was in epoxy resin system.

Adhesive compound “c” was in water vinyl urethane resin system.

Adhesive compound “d” was in cyanoacrylate resin system.

Adhesive compound “e” was in acylic emulsion resin system.

TABLE 3

| | Appearance | | | | | Syn- |
|---|---|---|---|---|---|---|
| Adhesive | depres- | Conti- | Uniform- | Proof | | thetic |
| compound | sion | nuity | ity | Weath. | Heat | judge |
| “a” | A | A | A | A | A | A |
| “b” | A | A | A | A | A | A |
| “c” | B | A | A | A | B | B |
| “d” | A | A | A | B | A | B |
| “e” | B | B | A | A | B | B |

As will be understood from Table 3, adhesive compounds “c”, “d” and “e” are not suitable for practical usage, but adhesive compounds “a” and “b” are available for the adhesion between the panel and the butt edge strips.

The adhesive compound in the urethane resin system contains NCO material, OH material and additives. Typical examples of NCO material are urethane pre-polymer, HDI buret and HDI or IPDI trimmer. HDI means hexamethylene diisocyanate, and IPDI means isophorone diisocyanate. Typical examiners of OH material are low-molecular polyol less in molecular weight than 1000, polyether polyol and polyester polyol.

The adhesive compound in the epoxy resin system is formed by mixing hardner in the amino derivative with epoxy resin. Typical examples of the amino derivative are ethylenediamine, diethylene triamine and triethylene tetraamine.

However, adhesive compound “c” is suitable for an automatic bonding system, because it rapidly adhere the panel and the butt edge strips. Moreover, the water vinyl urethane resin is good in operability because of its molecular weight. Further, the water vinyl urethane resin is fairly large in adhesion.

The water vinyl urethane resin system is called as water based polymer-isocyante adhesives for wood in JIS standards.

Vinyl acetate and cyano acrylate are similarly desirable for the automatic bonding system.

The present inventors prepared the following comparative examples, and evaluated them.

The first comparative example was similar to specimen “26” except for a phenol resin impregnated panel of 0.6 millimeter thick. The phenol resin impregnated panel was attached to the butt edge strip, and the butt edge strips were bonded to the four butt edges of a plywood panel through the phenol resin impregnated panel. The plywood panel and the butt edge strips were coated with the unsaturated polyester resin as similar to specimen “26”.

The second comparative example was similar to specimen “27” except for the phenol resin impregnated panel. The butt edge strips were bonded through the phenol resin impregnated panel as similar to the first comparative example. The plywood panel and the butt edge strips were coated with the unsaturated polyester resin as similar to specimen “27”.

The third comparative example to the fifth comparative example were also similar to specimens “28”, “29” and “30” except for the phenol resin impregnated panel. The butt edge strips were bonded to the plywood panels as similar to specimens “26” and “27”, and the plywood panels and the butt edge strips were coated with the unsaturated polyester resin as similar to specimens “26” and “27”.

The comparative examples were evaluated as shown in Table 4.

TABLE 4

| Compara-tive example | Thickness of Polyester film | Warp after Harden-ing | Appearance depres-sion | Conti-nuity | Uniform-ity | Syn-thetic judge |
|---|---|---|---|---|---|---|
| 1 | 0.3 | A | A | C | A | C |
| 2 | 0.6 | B | A | C | A | C |
| 3 | 1.2 | B | A | C | A | C |
| 4 | 2.5 | C | A | C | A | C |
| 5 | 5.0 | C | A | C | A | C |

Comparing specimens 26 to 30 with the comparative examples 1 to 5, the phenol resin impregnated panel deteriorates the appearance of the board, and it is better to directly bond the molded butt edge strips to the panel.

As will be appreciated from the foregoing description, the molded butt edge strip improves the appearance of the board member, and the method of finishing a board member is advantageous over the prior method by virtue of the molded butt edge strip.

Although particular embodiments of the present invention have been shown and described, it will be obvious to those skilled in the art that various changes and modifications may be made without departing from the spirit and scope of the present invention. For example, the butt edge strips 13 and the resin film 16 may be colored in brown, white and so forth.

What is claimed is:

1. A method of finishing a board member comprising the steps of:

a) molding a butt edge strip of a first resin, said first resin being an unsaturated polyester resin having a breaking energy equal to or greater than 40 kg %/mm$^2$, said butt edge strip having dimensions approximately equal to a butt edge of a panel member and having a thickness large enough to make said butt edge invisible after a polishing without resulting in any waviness and/or cracks;

b) bonding said butt edge strip to said butt edge of said panel member;

c) coating a major surface of said panel member and an edge of said butt edge strip with a finishing film of a second resin; and d) polishing said butt edge strip and said finishing film.

2. The method as set forth in claim 1, in which said first resin is unsaturated polyester resin, said method further comprising the step of hardening said butt edge strip at 50 to 150 degrees centigrade between said step a) and said step b).

3. The method as set forth in claim 1, in which an adhesive compound selected from the group consisting of adhesive compounds in an urethane resin system and adhesive compounds in an epoxy resin system is used for bonding said butt edge strip to said panel member.

4. The method as set forth in claim 3, in which said adhesive compound bonds said butt edge strip to said panel member at 15 to 130 degrees centigrade under pressure ranging from 0.05 MPa to 2.00 MPa.

5. The method as set forth in claim 1, in which said second resin is selected from the group consisting of unsaturated polyester resin, urethane acrylate resin and epoxy resin.

6. The method as set forth in claim 1, in which said major surface is coated with said finishing film by using one of a curtain flow coater, a spray coater, a roll coater and an electrostatic coating system.

7. The method as set forth in claim 1, in which said first resin and said second resin are unsaturated polyester resin.

8. The method as set forth in claim 7, in which said first resin is unsaturated polyester having a breaking energy equal to or greater than 40 kg %/mm$^2$, and the unsaturated polyester resin serving as said second resin is harder than said unsaturated polyester resin serving as said first resin.

9. The method as set forth in claim 1, in which an adhesive compound selected from the group consisting of water vinyl urethane resin, vinyl acetate and cyano acrylate is used for bonding said butt edge strip to said panel member.

10. A method of finishing a board member comprising the steps of:

providing a panel member having butt edges and major surfaces coated with phenol impregnated plate members;

papering said panel member;

molding a butt edge strip of first unsaturated polyester resin wider than one of said butt edges of said panel member, said first unsaturated polyester resin having a breaking energy equal to or greater than 40 kg %/mm$^2$;

hardening said butt edge strip by applying heat;

bonding said butt edge strip to said one of said butt edges by using adhesive compound, said butt edge strip projecting from said major surfaces, said adhesive compound being selected from the group consisting of an urethane resin system and an epoxy resin system;

cutting parts of said butt edge strip so as to make both edges of said butt edge strip coplanar with said major surfaces;

coating one of said major surfaces and one of said edges with said unsaturated polyester resin by using a curtain flow coater;

applying heat to said second unsaturated polyester resin so as to be harder than said first unsaturated polyester resin; and polishing an exposed surface of the layer of said second unsaturated polyester resin and an exposed surface of said butt edge strip, said butt edge strip having a thickness large enough to make said one butt edge invisible after polishing without resulting in any waviness and/or cracks.

* * * * *